Sept. 20, 1955 M. SAMUELY 2,718,485
METHOD OF BONDING MECHANICAL ELEMENTS
Filed July 21, 1953 2 Sheets-Sheet 1
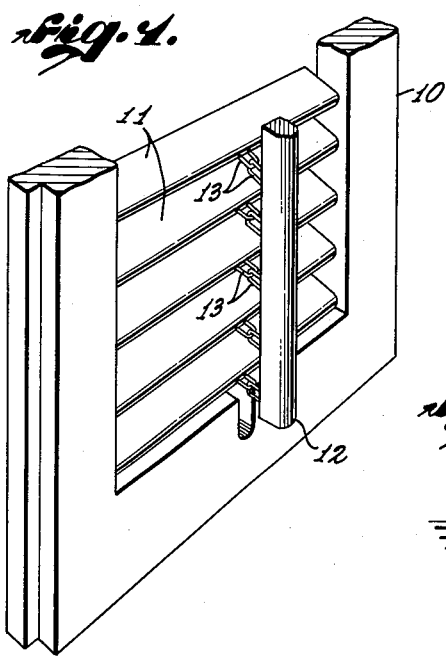
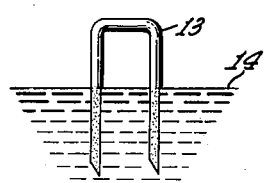
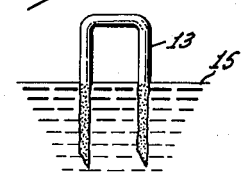
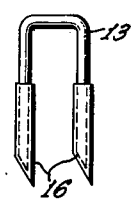
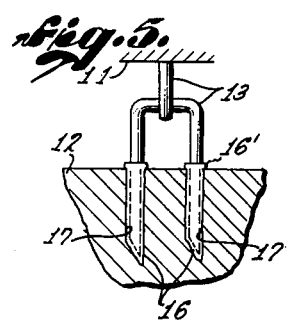
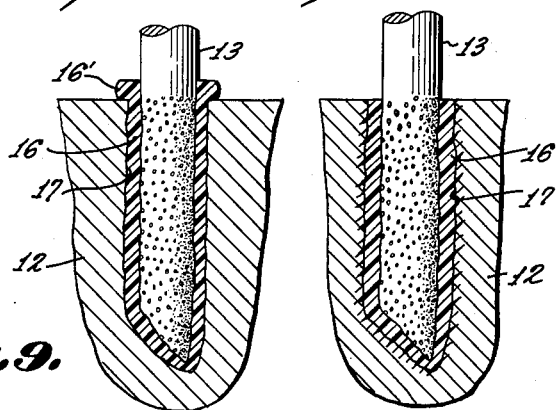
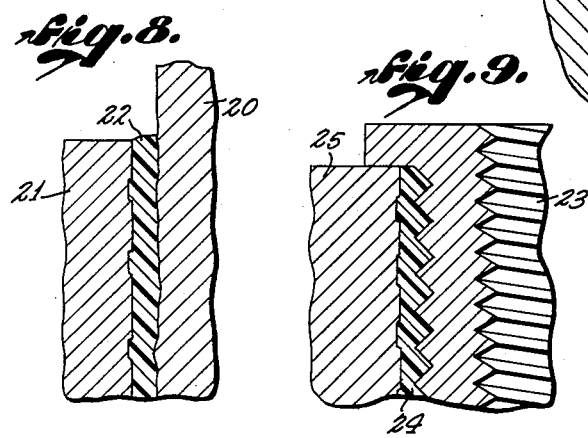
MAX SAMUELY,
INVENTOR.
HUEBNER, BEEHLER,
WORREL & HERZIG,
ATTORNEYS.
BY Sept. 20, 1955    M. SAMUELY    2,718,485
METHOD OF BONDING MECHANICAL ELEMENTS
Filed July 21, 1953    2 Sheets-Sheet 2

MAX SAMUELY,
INVENTOR.

HUEBNER, BEEHLER,
WORREL & HERZIG,
ATTORNEYS.
BY

United States Patent Office 2,718,485
Patented Sept. 20, 1955

---

2,718,485

METHOD OF BONDING MECHANICAL ELEMENTS

Max Samuely, Los Angeles, Calif., assignor to Paul P. Heinley, Santa Monica, Calif.

Application July 21, 1953, Serial No. 369,437

8 Claims. (Cl. 154—126.5)

This invention relates to the bonding together of mechanical elements and is more particularly directed to a method employing a thermo-plastic bonding material having a relatively low melting point.

Various methods of uniting or connecting mechanical elements have heretofore been practiced, these prior methods including welding, brazing, soldering, cementing and/or gluing.

Welding, brazing, soldering, or other similar methods usually require the use of metal bonding agents having relatively high melting points. Such methods involve the use of high fusing temperatures which would be prohibitive in any instance wherein one of the mechanical elements to be bonded is constructed of a low melting point material or of a material which would be seriously injured or charred by relatively high temperatures.

Cementing and/or gluing, in the generally accepted sense, involve the use of water soluble bonding agents which solidify by the evaporation of their fluid contents. Ordinary cement is a normally dry powdered calcinated limestone which, in use, is rendered plastic by the addition thereto of water. After use, the plastic aqueous cement sets and cannot again be made plastic.

Gluing involves the use of an adhesive fluid usually capable of being applied to a surface and allowed to set and solidify by the evaporation of its liquid contents. Ordinarily, the glue is prepared for use by combining flake or ground glue stock with water and then boiling the mixture to produce a liquid glue of the desired consistency.

Evaporation of the liquid content of the applied glue may be speeded by heat but, after the glue has once set, continued application of heat tends to crystallize the applied glue. Thus it is that the solidified glue, even if it can be recovered, cannot be again melted merely by heating but must be again combined with added water and boiled as in the initial preparation expained above.

It will thus be obvious that, in gluing, as well as in cementing, the bonding agent is made plastic by the addition of water and not by melting and that such glues and cements are in no sense thermo-plastic.

Therefore, it is an object of the present invention to provide an improved method of bonding mechanical elements by the use of a thermo-plastic bonding agent which, in its plastic state, may be coated on one of the mechanical elements to solidify thereon by cooling and which, after assembly of said element with a second mechanical element, may be remelted and again solidified to create the bond.

A further object is to provide a method of bonding assembled mechanical elements while in their assembled condition.

Another object is to provide a method employing a bonding agent which is rendered plastic by heating alone, as distinguished from bonding agents rendered plastic by addition of water or other fluids, and which solidify by cooling, and as distinguished from bonding agents which set or solidify by evaporation of their liquid content.

Another object is to provide a method of bonding mechanical elements, at least one of which is an electro-conductive element, by a thermo-plastic bonding agent, which method includes assembling said elements and bonding agent and subjecting the assembly to the influence of a pulsating or alternating magnetic or electric field.

A further object is to provide a bonding method employing a thermo-plastic bonding material of relatively low melting point which may be effectively used in the bonding of mechanical elements in situations in which one of said elements is constructed of wood or other low heat-resistant material.

Another object is to provide a method of bonding employing a thermo-plastic bonding material and which will be fully capable of bonding metal staples, nails and other similar mechanical elements driven or otherwise inserted in an element formed of wood, as for example, in the case of staples connecting a tilt rod and louvers in an adjustable shutter.

Another object is to provide a bonding method which is particularly effective in the speedy low cost production of assembled products, with a minimum use of skilled labor, and with a high degree of uniformity of such products.

Various other objects and advantages will be more fully apparent from the following description of the accompanying drawings which form a part of this disclosure and which illustrate certain steps of the preferred method and various products produced by the employment of said method.

In the drawings:

Fig. 1 is a perspective view of a portion of a shutter having a series of pivoted louvers and an operating tilt rod hingedly connected by metal staples bonded in the respective members by my improved method.

Fig. 2 illustrates the dipping of the tangs of a staple into an acid bath.

Fig. 3 illustrates the dipping of said tangs into a bath of hot thermo-plastic bonding material.

Fig. 4 is an elevation of the coated staple, the thickness of said coating being exaggerated for illustration.

Fig. 5 is an elevation, partly in section, showing the coated staple driven into a mechanical member formed of wood.

Fig. 6 is an enlarged elevation, partly in section, showing one of the coated tangs of Fig. 5 prior to heating.

Fig. 7 is an enlarged elevation, partly in section, showing said tang fully bonded in the wood.

Fig. 8 is a greatly enlarged fragmentary section illustrating the bonding together of two metal members.

Fig. 9 is a greatly enlarged fragmentary section illustrating the bonding of a metal insert in a hole or aperture drilled or otherwise formed in a mechanical member formed of any desired material.

Figure 10:
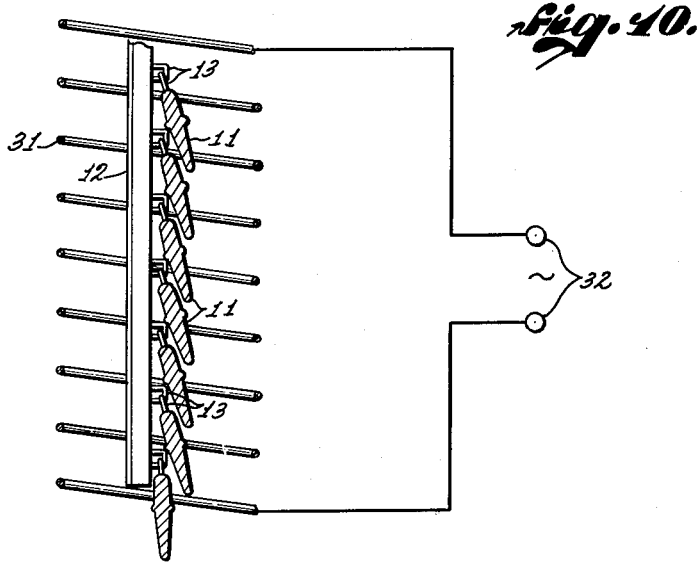
Fig. 10 is a schematic diagram of an electromagnetic heating unit or furnace, showing the stapled wood parts in process of having the thermo-plastic resin heated by induction.

In Fig. 1, the framework 10 of the shutter pivotally supports a series of louvers 11 in the usual well known manner and the several louvers are operatively connected to a tilt rod 12 by coengaging staples 13, the respective pairs of staples forming link connections between the several louvers and the associated tilt rod.

It has been found that in use, and even in the manufacture of such louvered shutters, the staples quite frequently become loose and pull out of the louvers and the tilt rod, especially when said louvers and rod are made of relatively soft wood, which is the usual practice.

Such loosening and pulling out of the staples is of great inconvenience and necessitates expensive repairs.

My improved bonding method, as practiced in the manufacture of louvered shutters, obviates the undesirable and costly occurrences above stated by securely bonding the staples in place.

In this use I may employ the regular commercial types of preformed metal staples or I may use staples directly from a suitable staple producing machine as they are formed from a coil of wire stock.

A method will now be described in connection with Figs. 2 to 7, and in connection with the use of staples formed of ferro-metallic material, such as iron wire.

As illustrated in Fig. 2, the tangs of the staple 13 are dipped in a bath 14 of acid to clean and minutely pit the surfaces thereof. I use for this purpose a medium solution of nitric and hydrochloric acids, although other cleansing and pitting solutions may be employed. The acid treated staple is then rinsed and afterwards dipped in a bath 15 of molten thermo-plastic bonding material, as illustrated in Fig. 3.

Various thermo-plastic bonding materials may be used to meet various bonding conditions. I prefer to use a non-metallic bonding agent such as thermo-plastic resin or the like which can be melted by a relatively low heat of a degree insufficient to seriously char or otherwise injure wood. At present I am using thermo-plastic vinyl resin which has proven highly desirable in connection with the use of this method in the manufacture of wooden shutters.

Upon withdrawing the staple from the bath 15, bonding material will cling to the tangs thereof and will then cool and solidify to form thereon a coating 16, as shown in Fig. 4.

The staple is thus conditioned for use and may now be driven into the wooden member in which it is to be bonded. In this driving in of the coated staple a slight portion of the bonding material will be scraped from the coating and collect at the surface of the member into which it is driven, forming a small, collar-like surplus 16' around each staple tang, as illustrated in Fig. 5. As illustrated in Fig. 6, in more or less exaggerated form, the driving in of the staple will form a driven hole whose side walls are somewhat irregular, such irregularity forming retention pockets 17 throughout the length of said hole.

With the mechanical members thus assembled, the assembly is heated to a degree sufficient to remelt the bonding material without injuring the members which are to be bonded. In this remelting, the bonding material fills the retention pockets 17 and penetrates the adjacent pores and interstices of the wood. The collar-like surplus 16' recedes into the hole to fully fill said hole and said pockets and adjacent pores (as illustrated in Fig. 7). Thus when the assembly is subsequently cooled to solidify the bonding material, the staple 13 is integrated into the wood by the bonding action.

The remelting of the thermo-plastic sheath or coating 16 may be effected by any suitable means which raises the sheath to fusing temperature without harming the wood. Since the melting point of the preferred thermo-plastic resins is well below the char point of wood, such remelting may be effected by simply placing the entire assembly in an oven of suitable temperature, until the resin has fused; and then removing the assembly and allowing the resin to re-harden.

However, such a process involves bringing the entire assembly, including the wood, up to temperature, and is therefore not only slow but wasteful of heat. It is therefore preferred to employ a process which heats primarily only the staple 13. In this way the resin sheath 16 may be fused without elevating appreciably the wooden parts of the assembly.

Heating of the staple only may be conveniently effected by electromagnetic induction, i. e. by either an alternating magnetic field or an alternating electric field, or by a combination thereof. An example of magnetic heating is shown schematically in Fig. 10, wherein the shutters 11, connected by staples 13 to the rod 12, are shown inside an induction furnace represented schematically by the coil 31. The coil 31 is energized by an alternating voltage 32 of reasonably high frequency, as for example, from 500 to 5,000 C. P. S.

Figure 11:
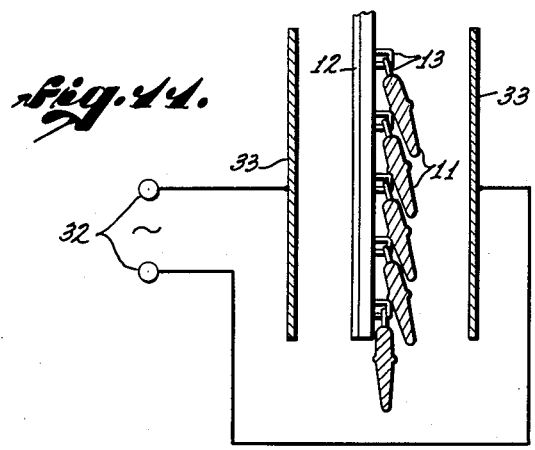
Fig. 11 is a schematic diagram showing melting of the resin by electric field heating in contrast to the magnetic heating of Fig. 10.

In Fig. 11 an arrangement is shown schematically for applying an alternating electric field to the assembly 11, 12, 13. This arrangement comprises a pair of spaced capacitor plates 33 between which the assembly is placed. A source of high frequency alternating voltage 34 is applied across the plates 33.

In either arrangement, Fig. 10 or Fig. 11, the heating effects of the alternating field will be confined almost entirely to the staples 13, since they are so much more conductive, electrically, than the wooden parts 11 and 12. Hence the resin sheath 16 will be quickly fused without appreciable elevation in temperature of the wood.

The induction heating of Figs. 10 or 11 may be employed wherever the staple 13 is of electrically conductive material such as iron, steel, copper, brass, etc.

While the above detailed description contemplates the use of my method as it is employed in the bonding of metal staples in wood, it will be understood that it is equally adaptable for use in the bonding of nails or other mechanical elements in wood or other similar members, or that it can be employed in the bonding of a metal member inserted in a matching hole or aperture drilled or otherwise formed in a second member to be bonded. In such drilled hole or machined aperture the tools used will leave certain tool marks which will, in effect, provide the retention pores and irregularities desirable for a good bond.

In Fig. 8 there is illustrated a bonding together of two metal elements 20 and 21 by thermo-plastic bonding material 22. This bonding is accomplished by my method above described. To re-fuse the thermo-plastic in effecting a metal-to-metal bond, electromagnetic heating as described above may be used; but the striking advantages of this type of heating for metal-to-wood (or other non-conductor) are not present in metal-to-metal bonding, because all of the metal tends to heat up.

In Fig. 9 I have shown a metal threaded insert 23 having a grooved outer surface and bonded by bonding material 24 in an aperture formed in a second member 25, which second member may be formed of any suitable material, such as Bakelite or the like as used for electric switches or other electrical installations. This bonding is also accomplished by my method above described.

In its broadest aspects, this invention is not limited to a requirement that either member be of conductive material. When both members are non-conductive, however, inductive or electromagnetic heating cannot be used.

Figure 12:
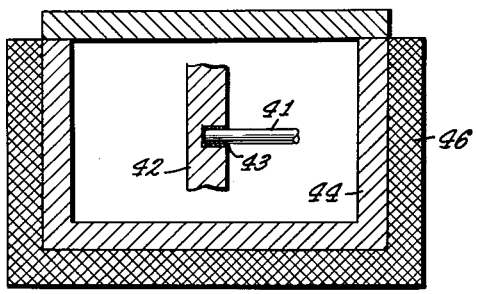
Fig. 12 is a vertical section of a furnace shown schematically and containing articles to be bonded together in accordance with the present invention.

An example of such a bond is illustrated schematically in Fig. 12, wherein a wooden dowel 41 is shown inserted in a bore in another wooden member 42. The dowel 41 has previously been dipped in molten thermo-plastic 43 which has been allowed to solidify. The assembly 41—42 is placed in a furnace 44 heated by any suitable means 46 to a temperature sufficient to re-melt the thermo-plastic 43, but not harm the wood. After fusing of the thermo-plastic 43, the assembly is removed from the furnace 44 and allowed to cool.

From the foregoing description, it will be evident to those skilled in the art that my improved method is admirably adapted for use in the construction of a relatively wide variety of manufactured products, that it may be practiced with a minimum of skilled labor and factory equipment, and that it provides a close control of the uniformity of the manufactured product thus holding to a minimum the number of units that may be rejected as defective. The employment of my improved method will effect a substantial reduction in production time and unit cost of the manufactured products involved.

The coating of thermo-plastic resin may be applied in steps, as described, or in a continuous dipping or spraying process, and to only the portions where bonding is to occur or to the whole surfaces if preferred.

What I claim as new and desire to secure by Letters Patent is:

1. In a method of bonding, the steps comprising: treating with acid that portion of a metallic member which is to be bonded to clean and pit the surface thereof, rinsing said member, dipping the acid treated portion of said member in a bath of melted thermo-plastic resin, to form thereon a coating of said resin, allowing said coating to cool to a solid state, placing said coated portion closely adjacent to a second member to be bonded, passing the members thus assembled through a high frequency magnetic field to heat the coated member and re-melt the resin, and subsequently allowing the assembly to cool to again solidify said resin and thus complete the bond.

2. In a method of bonding, the steps comprising: coating with melted thermo-plastic resin an end portion of a metal fastening means, allowing said coating to cool to a solid state, driving the coated portion of the fastening means into wood to which it is to be bonded, passing the assembly through a high frequency magnetic field to heat said assembly and re-melt the coating and cause a portion thereof to penetrate the adjacent pores of the wood, and subsequently allowing the assembly to cool to again solidify said coating and thus complete the bond.

3. In a method of bonding, the steps comprising: coating with melted thermo-plastic resin the tangs of a metal staple which is to be bonded, allowing the coating to cool to a solid state, driving the coated tangs of the staple into wood to which it is to be bonded, passing the assembly through a high frequency magnetic field to heat said assembly and re-melt the resin and cause a portion thereof to penetrate the adjacent pores of the wood, and subsequently allowing the assembly to cool to again solidify said resin and thus complete the bond.

4. In a method of bonding, the steps comprising: dipping the tangs of a metallic staple in an acid bath to clean and pit their surfaces, rinsing the staple, dipping the acid treated tangs of said staple in a bath of melted thermo-plastic resin to form thereon a coating, allowing said coating to cool to a solid state, driving the coated tangs of the staple into wood to which it is to be bonded, passing the assembly through a high frequency magnetic field to heat said assembly and re-melt the resin and cause a portion thereof to penetrate the adjacent pores of the wood member, and subsequently allowing the assembly to cool to again solidify said resin and thus complete the bond.

5. In a method of bonding, the steps comprising: coating with melted thermo-plastic resin that portion of a metallic member which is to be bonded, allowing the coating to solidify, placing said coated portion closely adjacent a second member to be bonded, subjecting the members thus assembled to the influence of a high frequency magnetic field to heat the coated member and re-melt the resin, removing the assembly from the influence of said field, and subsequently allowing the assembly to cool to again solidify said resin and thus complete the bond.

6. In a method of bonding, the steps comprising: coating with a melted thermo-plastic resin that portion of a mechanical element which is to be bonded to another element, allowing the coating to solidify, placing said coated portion closely adjacent a second mechanical element to be bonded, heating the thus assembled elements to re-melt the resin, and then cooling the assembly to again solidify said resin and thus complete the weld.

7. In a method of bonding, the steps comprising: coating with a melted thermo-plastic bonding agent having a relatively low melting point that portion of a mechanical element which is to be bonded to another element, allowing said coating to solidify, placing said coated portion closely adjacent a second mechanical element to be bonded, heating the thus assembled elements to re-melt the bonding agent, and then cooling the assembly to again solidify said bonding agent and thus complete the weld.

8. Method of bonding a conductive member to a non-conductive member comprising coating at least a portion of said conductive member with a thermo-plastic resin, placing said coated portion against said non-conductive member, and subjecting said members to an electromagnetic field, thereby to heat said conductive member up to a temperature sufficient to fuse said resin, whereby said resin flows into good bonding relation with said non-conductive member.

References Cited in the file of this patent

UNITED STATES PATENTS

| | | |
|---|---|---|
| 731,928 | Mattice | June 23, 1903 |
| 2,125,316 | Ronci | Aug. 2, 1938 |
| 2,397,471 | Cox | Apr. 2, 1946 |
| 2,535,794 | Hempel | Dec. 26, 1950 |
| 2,690,879 | Snyder | Oct. 5, 1954 |